United States Patent [19]

Bozeman, Jr.

[11] 4,018,422

[45] Apr. 19, 1977

[54] BUNDLE CONDUCTOR STRINGING BLOCK WITH ROTARY THREADING GATE

[75] Inventor: Hoyt W. Bozeman, Jr., Glendora, Calif.

[73] Assignee: Lindsey Manufacturing Company, Azusa, Calif.

[22] Filed: Sept. 9, 1975

[21] Appl. No.: 611,679

[52] U.S. Cl. .................... 254/134.3 PA; 254/193; 254/197

[51] Int. Cl.² ......................................... B66D 1/36

[58] Field of Search .......... 254/134.3 PA, 134.3 R, 254/190, 192, 193, 197

[56] References Cited

UNITED STATES PATENTS

| | | | |
|---|---|---|---|
| 2,527,651 | 10/1950 | Pieper | 254/134.3 PA |
| 2,806,380 | 9/1957 | Martin | 254/134.3 PA |
| 3,077,337 | 2/1963 | Cronkright | 254/134.3 PA |
| 3,195,862 | 7/1965 | Sherman | 254/197 |
| 3,479,014 | 11/1969 | Reilly et al. | 254/197 |
| 3,868,089 | 2/1975 | Lindsey et al. | 254/134.3 PA |
| 3,905,581 | 9/1975 | Chadwick | 254/193 |

Primary Examiner—Al Lawrence Smith
Assistant Examiner—Robert C. Watson
Attorney, Agent, or Firm—Sellers and Brace

[57] ABSTRACT

A bundle conductor stringing block having provision for threading the same with a conductor hauling line as the line is dispensed from an aircraft. For this purpose one side frame of the block is provided with a rotary gate having a slot to receive and transfer the hauling line into the block throat and onto a central sheave. The spring-biased gate is held cocked open by a latch released by entry of the hauling line into the slot whereby the gate rotates to its line discharge position. The block includes guard members positioned in the plane of the throat until pivoted to a position clear of the throat by entry of the conductor running board. To minimize the bending moment on the sheave shaft, the axis of the threading gate is located inwardly of a vertical plane through the exterior face of the underlying outer sheave of the block.

36 Claims, 7 Drawing Figures

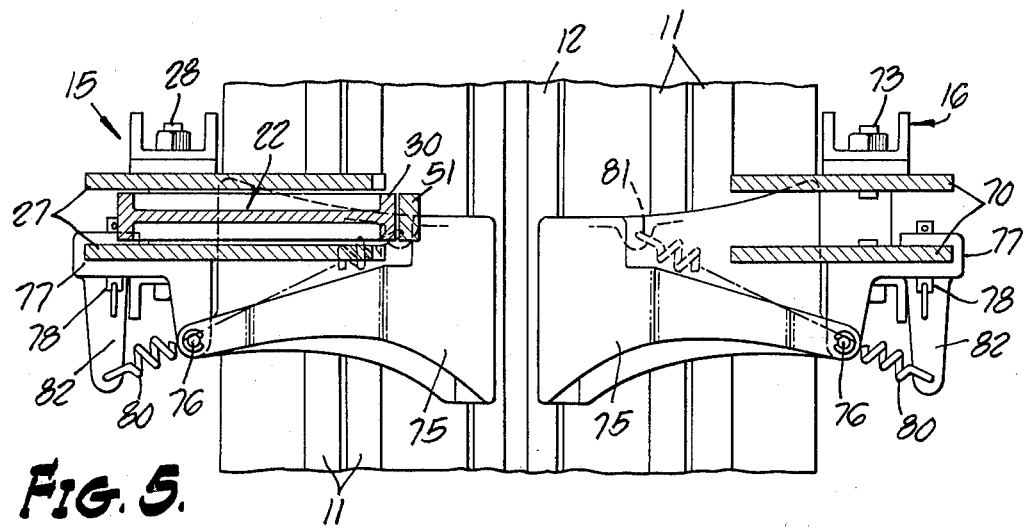
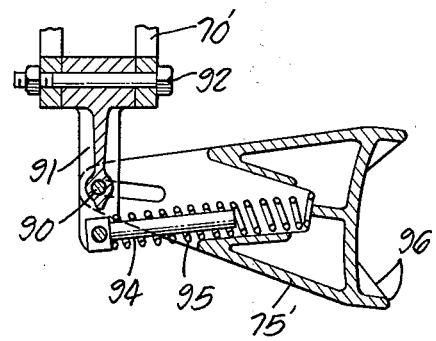
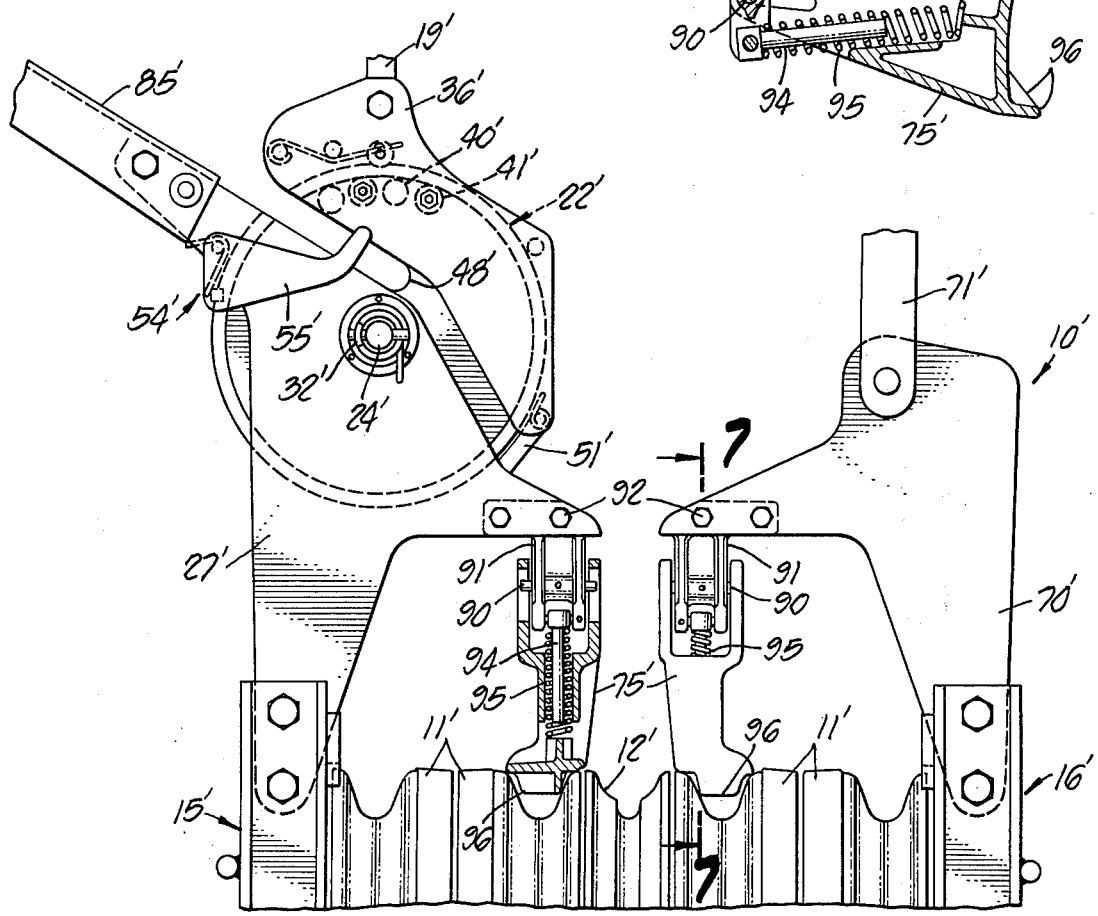
FIG. 5.
FIG. 7.
FIG. 6.

BUNDLE CONDUCTOR STRINGING BLOCK WITH ROTARY THREADING GATE

This invention relates to bundle conductor stringing blocks, and more particularly to an improved block construction provided with a rotary threading gate powered by a spring and held cocked in its open position by a latch released by entry of the line into the gate slot whereupon the spring rotates the gate to transfer the hauling line into the block throat.

The installation of bundle type power conductors along a power line involves simultaneously pulling each of two or more power conductors along the power line at a level convenient for connecting these conductors to the power line insulators. Owing to the size and weight of bundle conductors, large, heavy stringing blocks are suspended from or adjacent the lower ends of the power line insulators. The hauling line for the conductors must then be threaded through the throat of successive ones of the stringing blocks. Initially, this threading operation was performed by hand but, in recent years, techniques have been developed for threading the hauling line through the stringing blocks as the line is dispensed from an aircraft, such as a helicopter flying along one side of the power line.

One proposal for performing this by aircraft operation is disclosed in the copending application for U.S. Pat. Ser. No. 515,005, filed Oct. 4, 1974 by Keith E. Lindsey and L. E. Lindsey. Another and related stringing block threadable by aircraft is disclosed in U.S. Pat. No. 3,868,089 granted Feb. 25, 1975 to the same applicants as the aforesaid copending application. In each of these prior constructions, a load transfer gate is pivotally supported crosswise of the threading passage for the conductor hauling line. When this gate is closed and the block is under load, the gate cooperates with a detent to transfer load stresses crosswise of the threading passage. However, during the threading operation, the gate is open and in consequence free of contact with the detent. Accordingly, each of these prior constructions must have a frame and a sheavesupporting shaft of sufficient strength to be supported rigidly by one side frame until the hauling line has been threaded into the block throat. Typically, stringing blocks of the character dealt with weigh several hundred pounds. Accordingly, the frames and sheave shafts of blocks threadable by aircraft must be very strong.

The foregoing and other disadvantages of prior stringing blocks threadably by aircraft are avoided by the present invention by utilizing a rotary threading gate mounted intermediate the opposite ends of one side frame and so constructed that it is continuously effective to transfer load stresses between the opposite ends of its supporting side frame. Accordingly, both of the block side frames share the block load at all times and during the hauling line threading operation. Bending moment stresses on the sheave shaft are held to a minimum by locating the axis of the threading gate inside the outer face of the adjacent outer sheave. This design criteria not only minimizes bending stresses imposed on the block shaft but contributes materially to weight reduction without sacrifice of strength. The block also includes provision for confining the hauling line to portions of the block throat such that it cannot become jammed in or cause damage to the principal components of the block. Such means include a guard preventing entry of the hauling line into the gate slot as well as spring-biased, pivotally supported guards preventing the hauling line from shifting to other than the central one of the block sheaves. Also provided is a guide horn for piloting the hauling line into the gate slot during the threading operation. This horn normally extends upwardly and outwardly from the lower side of the slot but is foldable to a collapsed position along one side of the block when not in use.

In one preferred species, the two hauling line guard members are detachably supported on a respective one of the block side frames for swinging movement in a generally horizontal plane between their stable operating and non-operating positions. In a second embodiment, the guard members are supported in vertical planes to either side of the hauling line supporting sheave and include a toggle linkage permitting the guards to swing upwardly to a retracted position along one or the other side of the plane of the throat. This permits the runningboard to pass in either direction through the throat without need for detaching or making any change in the hauling line guard units.

Accordingly, it is a primary object of the invention to provide a bundle conductor stringing block one side frame of which is provided with a rotary hauling line threading gate having various unique features.

Another object of the invention is the provision of a conductor stringing block having a rotary threading gate the axis of which overlies the outermost one of the block sheaves and inwardly of the outer face of this sheave.

Another object of the invention is the provision of a conductor stringing block having a rotary threading gate provided with a hauling line receiving slot and equipped with spring means for rotating the gate to transfer the hauling line from the exterior of the block into the block throat.

Another object of the invention is the provision of a conductor stringing block having a rotary threading gate and provided with guard means to protect parts of the block by confining the hauling line after delivery into the throat to certain areas of the throat.

Another object of the invention is the provision of a conductor stringing block having a rotary threading gate operable to transfer the conductor hauling line into the block throat through a path overlying the gate axis.

Another object of the invention is the provision of a stringing block having a rotary threading gate having guard means operable to prevent escape of the hauling line after being dropped thereinto and including guard means to prevent re-entry of the hauling line into the gate slot after the hauling line has been transferred into the block throat.

These and other more specific objects will appear upon reading the following specification and claims and upon considering in connection therewith the attached drawing to which they relate.

Referring now to the drawing in which a preferred embodiment of the invention is illustrated:

FIG. 5 is a fragmentary transverse cross-sectional view taken along 5—5 on FIG. 1;

FIG. 6 is a fragmentary transverse elevational view similar to FIG. 1 through the throat portion of a second preferred species of the invention; and FIG. 7 is a cross-sectional view on an enlarged scale taken along broken line 7—7 on FIG. 6 but showing the hauling line guard member pivoted to one of its two stable inoperative positions.

Figure 1:
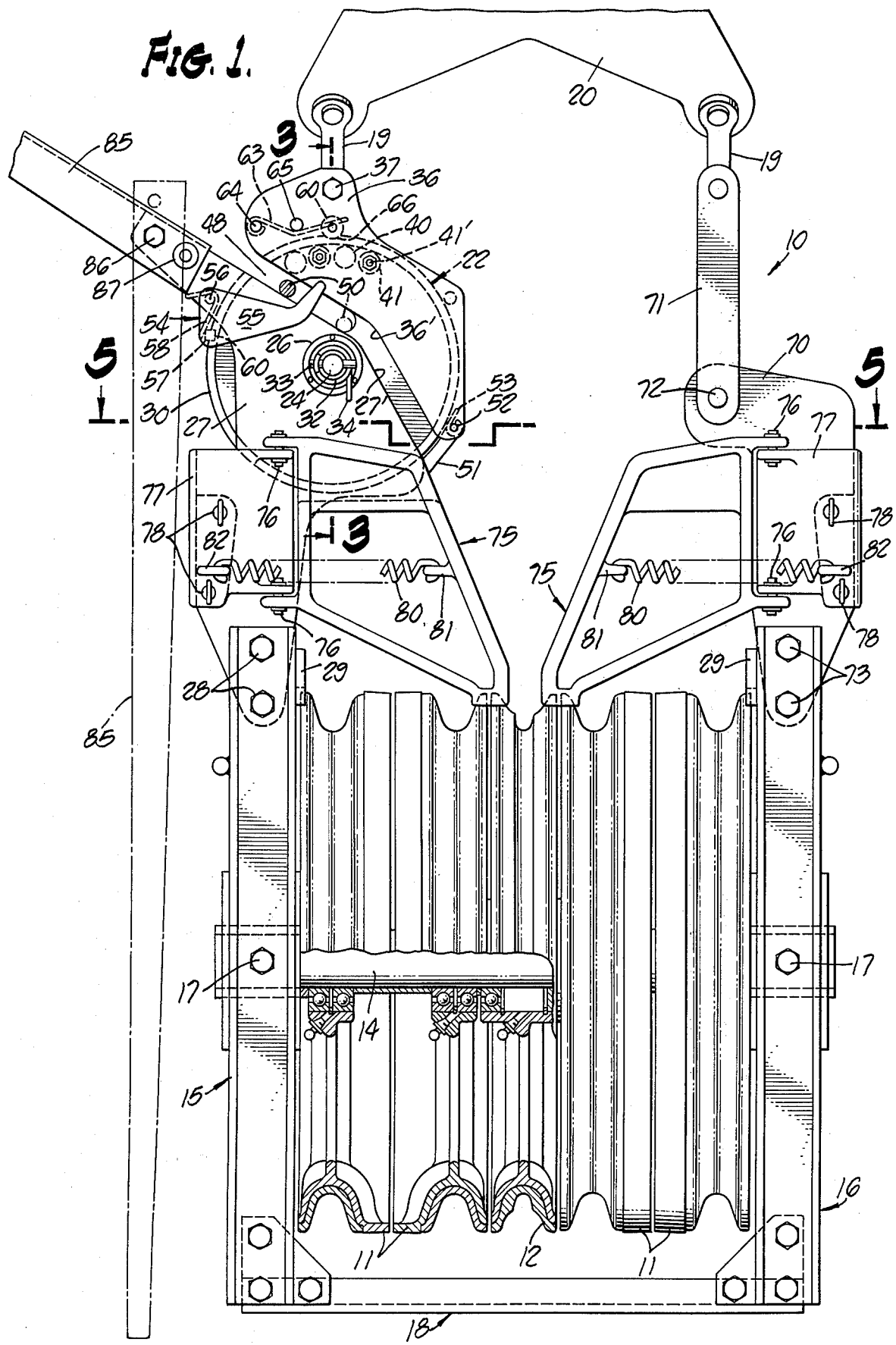
FIG. 1 is a transverse elevational view of one preferred embodiment of a bundle conductor stringing block with a portion of the guide horn broken away and indicating in dot and dash line the collapsed position of the guide horn.

Referring initially to FIG. 1, there is shown a first preferred embodiment of the invention stringing block, designated generally 10, equipped with four conductor supporting sheaves 11 supported by shaft 14 on the opposite sides of a central hauling line sheave 12. The opposite ends of shaft 14 are rigidly secured to side frames 15 and 16 by bolts 17. As here shown, the lower ends of side frames 15, 16 are rigidly interconnected by a cross-frame member 18.

The stringing block side frames 15 and 16 extend upwardly a very substantial distance above the top peripheries of sheaves 11, 12, their upper ends being suspended by clevices 19, 19 from the lower corners of a yoke plate 20. This yoke plate may be of any suitable construction such as that designated 16 in Lance U.S. Pat. No. 3,076,866 granted Feb. 5, 1963.

Figure 2:
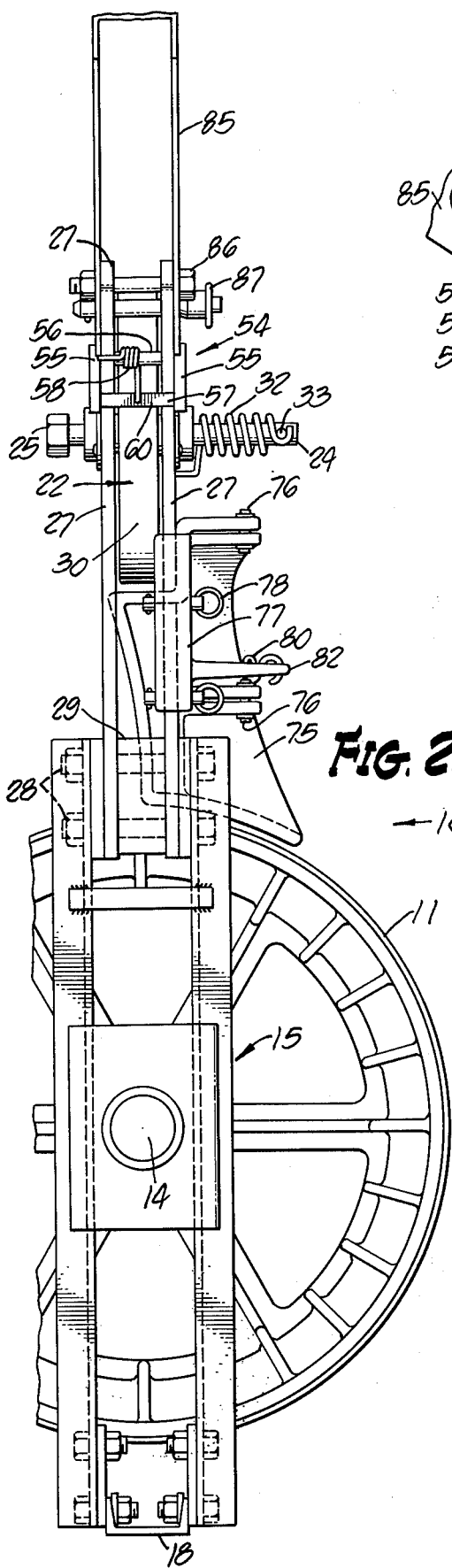
FIG. 2 is a fragmentary side elevational view of FIG. 2 as viewed from the left-hand side of FIG. 1.
Figure 3:
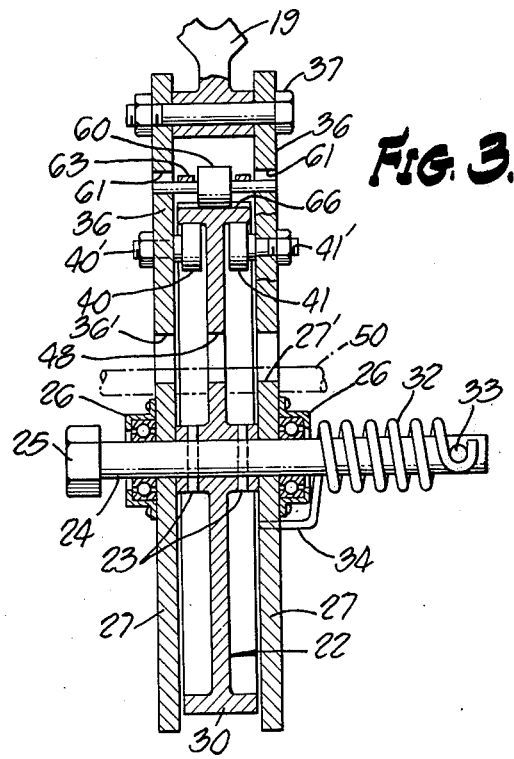
FIG. 3 is a fragmentary cross-sectional view on an enlarged scale taken along line 3—3 on FIG. 1.

Portions of frames 15 and 16 overlying the upper peripheries of the sheaves are constructed somewhat differently from one another in that side frame 15 includes the rotary threading gate 22 which lies generally in the same vertical plane as the axis of shaft 14. Gate 22 is fixed by pins 23 (FIG. 3) to a pin 24 having a wrench-engaging head 25. Pin 24 journalled in ball bearing assemblies 26, 26 secured to a respective one of a pair of plates 27, 27 clamped to the opposite sides of the upper end of frame 15 by bolts 28 and spacer block 29 (FIG. 2). Plates 27 extend along the opposite sides of the gate 22. As is best shown in FIG. 3, this gate comprises a wheel having an axial flange 30 projecting from its opposite sides for a distance somewhat less than the spacing between its supporting plates 27, 27. Gate 22 is suitably secured to the axial pin 24 and is urged to rotate clockwise as viewed in FIG. 1 by a strong torsion spring 32 having one end bearing against an anchor pin 33 secured to pin 24 and its other end 34 inserted in a hole in plate 27.

Figure 4:
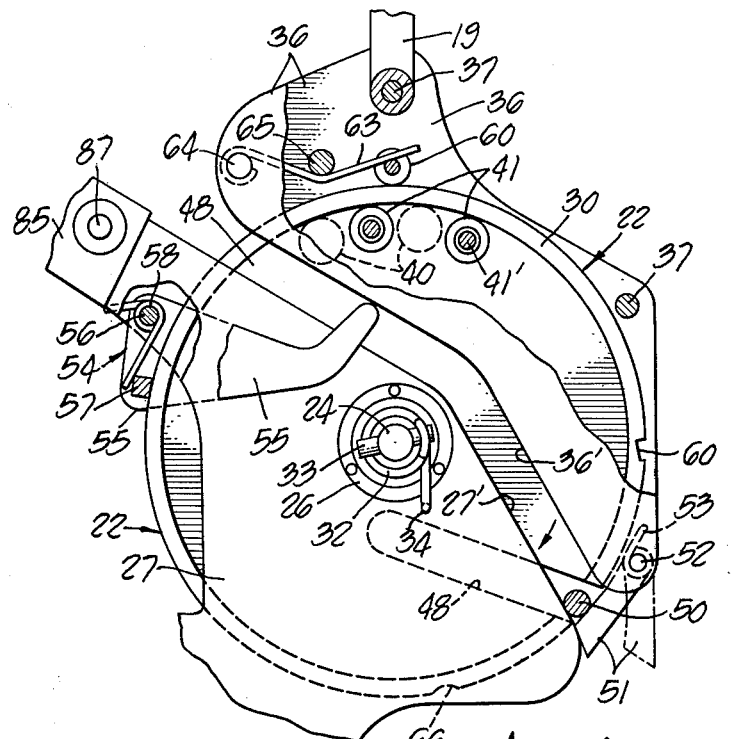
FIG. 4 is a fragmentary view of the threading gate subassembly showing the gate rotated clockwise to a position for discharging the hauling line into the block throat.

Referring to FIG. 4, it will be understood that the uppermost end of side frame 15 is formed by a pair of combination shroud and suspension plates 36, 36 lying in the same plane as plates 27, 27 and held spaced apart by bolts and spacer sleeves 37, 37, the suspension clevis 19 being supported by the uppermost one of bolts 37. The sole means holding the plates 36, 36 assembled astride the upper portion of gate 22 comprises two pairs of load-bearing rollers 40 and 41. These rollers are journalled on shouldered bolts 40', 41', respectively rigidly clamped to plate 36. The two pairs of rollers are staggered or circumferentially offset from one another along the upper portion of flange 30 and serve as a heavy duty load transfer means between the plates 36, 36 and gate 22.

The upper edges 27' of plates 27 and the lower edges 36' of plates 36 are vertically spaced from one another to provide a continuous threading gap crosswise of the upper end portion of side frame 15 through which the conductor hauling line passes while being transferred from the exterior side of side frame 15 and into the throat of the stringing block. It will be understood that this throat lies in a vertical slant between the upper ends of side frames 15, 16 and overlying the upper peripheries of sheaves 11, 12.

In order to accomplish the transfer of the hauling line through this threading gap, gate 22 is provided with a deep, non-radial slot 48 extending inwardly through flange 30 to a point close to but offset from the axis of the gate as is best shown in FIG. 4. In this position of the gate, the gate is rotated to its hauling line discharge position and the hauling line indicated at 50 is positioned to fall by gravity out of the inlet end of the slot and past the normally closed guard gate 51. This gate is supported between plates 36, 36 on a pin 52 and is normally urged to the closed position shown in full lines by a torsion spring 53 encircling pivot pin 52. The weight and tension forces of the hauling line 50 bearing against gate 51 to serve to open the gate and permit the passage of the line therepast for gravitation onto the center sheave 12.

When gate 22 is cocked in its open position, slot 48 is in registry with the upper outwardly directed end of the threading gap as is shown in FIG. 1 and is latched in this cocked position by the latching unit designated generally 54 (FIGS. 1 and 4). This latching unit comprises a pair of plates 55, 55 pivotally supported along the exterior sides of plates 27 on a pivot pin 56. Plates 55 are fixed to this pivot pin and to a detent 57 urged to bear against the periphery of flange 30 by a torsion spring 58 encircling pin 56. Detent 57 seats in a notch 60 when in the rim of gate 22 when this gate is rotated counterclockwise one-half revolution from the position shown in FIG. 4 with slot 48 in registry with the upper end of the gap between plates 27 and 36. The forward ends of plates 55 then extend across slot 48 and lie in the path of the hauling line 50 as it falls downwardly toward the inner end of the slot.

When gate 22 is in its open position as shown in FIG. 1, roller 60 is spring pressed by spring 63 into a depression 66 (FIG. 4) extending crosswise of the outer periphery of gate 22. Roller 60 is loosely supported in vertical slots formed through plates 36. The left-hand ends of springs 63 embrace a bolt 64 extending between plates 36 whereas a midportion of spring 63 passes beneath a bolt 65 likewise extending between plates 36. When gate 22 is cocked in opened position, roller 60 seats in the recess 66.

The upper end of the stringing block side frame 16 does not require a rotary gate 22 and is connected to yoke 20 and clevis 19 by a pair of side plates 70, a pair of links 71 interconnected by a pivot pin 72. It will be understood that plates 70 correspond to plates 27, 27 and are connected to the upper end of side frame 16 by bolts 73 and the spacer bar 29.

To assure that hauling line 50 will be guided onto the top of central sheave 12, the stringing block is provided with a pair of guard members 75, 75 pivoted by vertical axis pivot pins 76 to bracket plates 77. The bracket plates 77 are preferably shaped to embrace the outer vertical edge of plates 70 in the manner best shown in FIG. 5 and are detachably secured thereto by quickly detachable assembly pins 78.

The guard members 75, 75 have two stable positions, one being that shown in FIGS. 1 and 5 wherein the guard members lie generally in the plane of the stringing block throat and crosswise of the upper peripheries of sheaves 11 and 12 and the other stable position being the open, inoperative position in which the guard members are held pivoted outwardly approximately 90° from the position shown in FIGS. 1 and 5 thereby leaving the throat of the stringing block clear and unobstructed. The guard members are held in these two stable positions by a toggle spring 80 having one end connected to the guard members as indicated at 81 in FIG. 5 and the other end connected to the bracket 82 when closed, the center line of spring 80 lies slightly above the axis of pivot pin 76 as viewed in FIG. 5 when the guard members 75 are in their closed position whereas when the center line of this spring is below the axis of pins 76, it is effective to hold the guard members in their open position.

To guide or pilot the hauling line 50 into slot 48 of gate 22 as the line is dropped from an aircraft, stringing block 10 is provided with a guide horn 85 extending upwardly and outwardly from the upper end of the side frame plates 27, 27 by a bolt 86 and a withdrawable pin 87. So long as pin 87 extends through the guide horn, the horn is rigidly secured in the position shown in FIG. 1. However, when pin 87 is withdrawn, the guide horn is free to pivot about bolt 86 to the collapsed or retracted dotted line position shown in FIG. 1.

The operation of the first embodiment shown in FIGS. 1–5 will be readily apparent from the foregoing detailed description of the block components and their relationship to one another. Stringing block 10 is suspended from the lower end of the yoke 20 by the clevices 19. Initially the threading gate 22 will be in the closed position shown in FIG. 4 wherein the entrance or outer end of the threading slot 48 is approximately the four 0'clock position as shown in FIG. 4. To position the gate in its open, hauling line receiving position, the workman places a wrench on the hexagonal head 25 of the gate pivot pin 24 and rotates the gate counterclockwise (FIG. 4) one half turn so that notch 60 (FIG. 4) will be engageable with detent 57 of latch 54. Spring 58 will then pivot detent 57 into notch 60 and lock the gate cocked in open position with slot 48 positioned to receive a hauling line dropped onto horn 85. Roller 60 (FIG. 1) will also be seated in recess 66 (FIG. 4) of gate 22.

The operator also makes certain that the guide horn 85 is in its operating position as shown in full lines in FIGS. 1 and 2. Additionally the guard members 55 are pivoted inwardly to extend crosswise of the throat with the lower edges overlying and resting against or close to the upper edges of central sheave 11 as shown in FIG. 1. They are held firmly in this position by toggle springs 80 the center lines of which will then lie slightly inwardly of the axis of their pivot pins 76.

As the aircraft flies past the stringing block, line 50 is dropped onto the guide horn along which it gravitates into the outer or inlet end of slot 48 of the threading gate 22. As the hauling line slides downwardly into slot 48, it will engage the free ends of latch 55 and pivot the latter clockwise about its pivot pin 56 thereby releasing the latch detent 57 from notch 66 thereby permitting the hauling line to pass into the innermost end of slot 48. The disengagement of detent 57 from notch 66 allows the stressed spring 32 to rotate the gate clockwise as viewed in FIG. 1. The gate rotates one half revolution as the hauling line is passed along the threading gap between the adjacent edges of plates 27 and 36 to the position shown in FIG. 4. As the hauling line reaches the exit end of slot 48, it will engage and open the guard gate 51 and gravitate downwardly between the adjacent edges of guard members 75, 75 onto the top of center sheave 12.

Along straight sections of the power line the hauling line will remain resting on the central sheave, but along curved sections of the power line, the tension in the line often tends to shift it laterally past one or the other edge of the central sheave. However, the line cannot migrate onto any other sheave owing to the presence across the throat of the guard members 75, 75.

If portions of the power line are located in valleys between higher portions of the lower line, the hauling line may be raised into upper portions of the stringing block throat. In these circumstances, the line is prevented from entry into slot 48 because gate 51 will be closed. Nor can the line come in contact with gate 22 while being pulled lengthwise of the power line because of gate 51 and the fact that plates 36, 36 extend radially beyond the rim of the gate, thereby protecting the gate from rubbing contact with the hauling line which could result in serious wear and damage to the gate.

Referring now to FIGS. 6 and 7, there is disclosed a modified embodiment of the invention which differs from that just described in two principal respects in that the guard units 75', 75' preventing movement of the hauling line onto the sheaves to either side of the center sheave are movable about horizontal axes rather than about vertical axes and are shiftable in either direction to either of two stable open positions from their normally closed operating position. The same or similar components of the second species are identified by the same reference characters as the first described species but are distinguished therefrom by the addition of a prime.

Guard members 75' are mounted in vertical planes closely beside the opposite lateral edges of central sheave 12' and are of the same type disclosed in the aforementioned Lindsey et al. U.S. Pat. No. 3,868,089. Guard members 75' have a slotted connection with a pivot pin 90 projecting from the opposite sides of the bracket 91 secured to plates 27', 70' by bolts 92. The opposite ends of the T-head of a T-bolt 94 are pivotally supported in the lower end of bracket 91. The stem of this bolt extends downwardly through the guard members 75' and is encircled by a compression spring 95 having its lower end bearing against the lower end of members 75'. Accordingly, this spring is effective to hold the arcuate lower end 96 (FIG. 7) of guard member 75' seated against the underlying one of sheaves 11'. When so supported, the guard members 75' are firmly secured in their stable, operating position and are highly effective in preventing the hauling line from migrating or shifting from the center sheave 12' onto sheaves 11'.

The alternate embodiment operates in the same manner described above in connection with FIGS. 1 to 5. When the hauling line has advanced the conductors to stringing block 10', the runningboard customarily interconnecting the trailing end of the hauling line to the advance end of the conductors will contact the guard members 75' and pivot these guard members about pivot pins 90 and away from their seating position on sheaves 11', 11'. As this occurs, the toggle springs 95 are effective to continue the pivotal movement of the guard member 75' until the same are firmly supported in a second stable position in a horizontal plane opposite pivot pin 90. Springs 95 are then effective to support the guard members in this stable position until they are forcibly reset to their original position.

While the particular bundle conductor stringing block with rotary threading gate herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A bundle conductor stringing block of the type having a plurality of sheaves mounted on a shaft having its ends mounted in suspension frame means, said frame means including threading means for passing a hauling line for a running board laterally crosswise of said frame means and into the block throat from one exterior side of said frame means, said threading means including rotary gate means journalled on said frame means and having a slot opening through the periphery thereof to receive a hauling line and to transfer the same crosswise of said frame means as said gate means rotates through a partial revolution, and means operable by the entry of a hauling line into said slot to release said gate means and including spring means to rotate said gate means after release through a partial revolution thereby to transfer said line across said frame means and deposit the same onto a central one of said sheaves.

2. A stringing block as defined in claim 1 characterized in that said gate means is journalled adjacent one upper lateral side of said stringing block.

3. A stringing block as defined in claim 1 characterized in the provision of manually operable means to cock said spring means and condition the same to rotate said gate means when released by contact with a hauling line entering said slot in the periphery of said gate means.

4. A stringing block as defined in claim 1 characterized in the provision of keeper means normally closing the outer end of said slot when said gate means is rotated to a position for discharging a hauling line onto said central one of said sheaves, and said keeper means opening in response to contact with the hauling line to permit a hauling line to move out of said slot and thereafter returning to the normally closed position thereof to prevent re-entry of the hauling line into said slot.

5. A stringing block as defined in claim 1 characterized in that said gate release means includes latch means engageable with said gate means to lock said gate means in a cocked hauling line receiving position with said slot directed upwardly and outwardly and with said spring means stressed in readiness to rotate said gate means and transfer a hauling line across said frame means into the block throat, and said latch means including means located in the path of a hauling line to unlock said latch means by the entry of the hauling line into said slot.

6. A bundle conductor stringing block having at least three sheaves mounted side by side on a shaft supported by a pair of side frames extending upwardly beyond the upper peripheries of said sheaves and cooperating therewith to form a throat for the passage of a running board attached to a bundle conductor, the upper end of one of said side frames including rotary gate means providing a rotary load transfer connection between two vertically aligned sections of said one side frame, said gate means lying in substantially a vertical plane extending crosswise of said sheaves and having a deep slot extending through the periphery thereof and terminating in an area offset to one side of the axis of rotation of said gate means, means for holding said gate means in a position wherein said slot can receive a conductor hauling line from the exterior side of said one side frame for transfer into said throat as said gate means rotates through a partial revolution and discharges the hauling line into said throat and onto a sheave of said stringing block, and first guard means movably positioned crosswise of and adjacent said slot effective to prevent entry of the hauling line back into said slot.

7. A stringing block as defined in claim 6 characterized in the provision of second guard means located in said throat and arranged to guide the hauling line onto the top of a central one of said sheaves as it gravitates from the outer end of said slot in said gate means and effective to prevent the hauling line from gravitating or shifting from said central sheave onto any other one of said sheaves.

8. A stringing block as defined in claim 7 characterized in that said second guard means are movably supported on said side frames and overlie the sheaves to either side of said central sheave prior to the entrance of the trailing end of the hauling line into the throat of said stringing block.

9. A stringing block as defined in claim 8 characterized in that said second guard means include spring means for holding said second guard means selectively in first and second stable positions in the first of which positions said second guard means are located generally in the plane of said throat and in the second of which positions said second guard means do not obstruct said throat.

10. A stringing block as defined in claim 9 characterized in that said second guard means are movable to either of two stable positions disposed on the opposite sides of the plane of said throat.

11. A stringing block as defined in claim 8 characterized in that said second guard means are mounted to pivot about a generally upright axis.

12. A stringing block as defined in claim 8 characterized in that said second guard means are mounted to pivot about a generally horizontal axis.

13. A stringing block as defined in claim 8 characterized in that the axis of said gate means extends crosswise of the axis of said sheaves and lies in a vertical plane substantially inwardly of the adjacent one of said side frames.

14. A stringing block as defined in claim 6 characterized in that the axis of said gate means extends crosswise of the axis of said sheaves and lies in a vertical plane adjacent the exterior face of the adjacent outer one of said sheaves.

15. A stringing block as defined in claim 6 characterized in that the axis of said gate means lies in a vertical plane parallel to the central one of said sheaves and between that sheave and the exterior face of the outer sheave closest to the axis of said gate means.

16. A stringing block as defined in claim 6 characterized in the provision of spring-actuated means interposed between said one side frame and said gate means operable to rotate said gate means between a first or hauling line receiving position and a second position for dispensing the hauling line onto said central sheave.

17. A stringing block as defined in claim 16 characterized in that said spring-actuated means includes a supporting pin fixed to said gate means and a spiral spring having one end fixed to said pin and the other end fixed to said one side frame.

18. A stringing block as defined in claim 1 characterized in the provision of means, including movable means, located in the path of the hauling line after entering said slot and operable to permit said hauling line to move therepast toward the inner end of said slot and thereafter effective to prevent the hauling line from retrograde movement out of said slot until said gate means has rotated to the dispensing position thereof.

19. A stringing block as defined in claim 18 characterized in that said last mentioned movable means is engageable with said gate means to lock the same against rotation and in position to receive the hauling line.

20. A bundle conductor stringing block for use in threading the same with a conductor hauling line by aircraft flying therepast while dispensing the hauling line therefrom comprising: a plurality of sheaves mounted on a common shaft supported at its ends by side frames projecting above the peripheries of said sheaves, rotary gate means journalled to the upper end of one of said side frames on an axis extending centrally through said gate means and crosswise of the axis of said shaft, said gate means having an axial flange embracing the peripheral portion thereof, a deep slot extending inwardly through the periphery and toward the axis of said gate means to receive an aircraft-dispensed hauling line, and suspension means for said one side frame embracing the uppermost portion of said gate means, and a plurality of rollers journalled on said suspension means and arranged in an arc for rolling engagement with the radially inwardly facing side of said axial flange of said gate means and cooperating therewith to transfer load forces between said suspension means and said gate means.

21. A stringing block as defined in claim 20 characterized in that said axial flange protrudes from the opposite faces of said gate means, and a plurality of rollers arranged in rolling contact with said axial flange on a respective side of said gate means.

22. A stringing block as defined in claim 21 characterized in that the rollers on one side of said gate means are staggered to lie between the axes of the rollers on the other side thereof.

23. A stringing block as defined in claim 20 characterized in the provision of guide horn means projecting upwardly and outwardly from the upper end of said one side frame and arranged to guide a hauling line into the slot of said gate means when the latter is cocked in the hauling line receiving position thereof.

24. A stringing block as defined in claim 23 characterized in the provision of pivot means for holding said guide horn means pivotally assembled to said one side frame, and quickly releasable means for locking said guide horn means in the hauling line receiving position thereof and operable to release said horn means from its locked position for pivotal movement to a captive collapsed position beside said one side frame.

25. A stringing block as defined in claim 20 characterized in that substantially all portions of said slot are located above the axis of said gate means when said slot is cocked to receive a hauling line dropped thereinto from an aircraft whereby the weight of said line and the tension forces acting therealong facilitate the rotation of said gate means through a partial revolution into a position to discharge the line into the block throat.

26. A stringing block as defined in claim 25 characterized in the provision of latch means for locking said gate means in cocked position with said slot positioned to receive a hauling line and including means actuable by a hauling line entering said slot to release said gate means from said cocked position.

27. A strining block as defined in claim 26 characterized in the provision of spring-operated means for rotating said gate means through a partial revolution incident to the release of said latch means.

28. A stringing block as defined in claim 20 characterized in the provision of spring-pressed roller means bearing against the outer periphery of said axial flange and effective to hold said plurality of rollers firmly in contact with the inwardly facing side of said axial flange.

29. A stringing block as defined in claim 20 characterized in that said suspension means for said one side frame embraces the major upper and inwardly facing portion of said rotary gate means to safeguard the same against contact by the hauling line if the latter rises above the central one of said sheaves.

30. A threading accessory for a bundle conductor stringing block comprising: a threading wheel having an axial annular flange at the periphery thereof and a deep threading slot opening through said flange, first and second bracket means embracing said wheel from the diametrically opposite peripheries thereof and including an axle pin connection between the center of said wheel and one of said bracket means, the other of said bracket means having at least one arcuate row of rollers journalled thereon with peripheries thereof bearing against the I.D. of said axial flange, the adjacent edges of said first and second bracket means being spaced apart and cooperating to provide a threading passage of predetermined size and shape for transferring a running board hauling line laterally of itself along said threading passage while occupying the threading slot in said wheel as the wheel rotates through a partial revolution, one of said bracket means being securable to the upper end portion of the side frame of a conductor stringing block and the other of said bracket means being connectable to suspension means attachable to a power line supporting structure.

31. A threading accessory as defined in claim 30 characterized in that said threading passage is inclined downwardly from its upper hauling line receiving end toward its lower discharge end.

32. A threading accessory as defined in claim 31 characterized in the provision of latch means movably mounted on one of said bracket means and engageable with said wheel to lock the same cocked with said slot in registry with the uppermost end of said threading slot and including means engageable by a hauling line entering said slot to release said latch means and permit said wheel to rotate until said slot is positioned to release the hauling line for movement along and out of the lower end portion of said threading passage.

33. A threading accessory as defined in claim 32 characterized in the provision of guide horn means projecting upwardly and outwardly from the lower side of the upper end portion of said threading passage and effective to guide a hauling line into threading the slot of said wheel when said wheel is locked in the cocked position thereof.

34. A threading accessory as defined in claim 30 characterized in the provision of guard means normally closing the lower end of said threading passage and arranged to open to release a hauling line from said threading passage and to reclose thereafter to prevent return movement of the hauling line therepast and back into said threading passage.

35. A threading accessory as defined in claim 30 characterized in that the upper end portion of said threading passage overlies said axle pin and that the lower end of said passage extends to a horizontal level below said axle pin.

36. A threading accessory as defined in claim 32 characterized in the provision of spring means urging said wheel to rotate from the locked position thereof when said latch means is released by a hauling line and transfer the hauling line into the lower end portion of said threading passage.

* * * * *